US012493750B2

(12) United States Patent
Yamanaka (10) Patent No.: US 12,493,750 B2
(45) Date of Patent: Dec. 9, 2025

(54) DETECTING APPARATUS, TRAINING APPARATUS, DETECTING METHOD, TRAINING METHOD, DETECTING PROGRAM, AND TRAINING PROGRAM

(71) Applicant: NTT, Inc., Tokyo (JP)

(72) Inventor: Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 251 days.

(21) Appl. No.: 18/025,916

(22) PCT Filed: Sep. 18, 2020

(86) PCT No.: PCT/JP2020/035631
§ 371 (c)(1),
(2) Date: Mar. 13, 2023

(87) PCT Pub. No.: WO2022/059209
PCT Pub. Date: Mar. 24, 2022

(65) Prior Publication Data
US 2023/0334262 A1    Oct. 19, 2023

(51) Int. Cl.
*G06F 40/40*    (2020.01)
*G06N 20/00*    (2019.01)

(52) U.S. Cl.
CPC ............. *G06F 40/40* (2020.01); *G06N 20/00* (2019.01)

(58) Field of Classification Search
CPC ...................................................... G06F 40/40
See application file for complete search history.

(56) References Cited

U.S. PATENT DOCUMENTS

| | | | |
|---|---|---|---|
| 2019/0362057 A1* | 11/2019 | Keret | G10L 17/02 |
| 2020/0204590 A1* | 6/2020 | Whitham | G06F 21/565 |
| 2020/0285737 A1* | 9/2020 | Kraus | G06F 21/552 |
| 2021/0271755 A1 | 9/2021 | Yamanaka | |

FOREIGN PATENT DOCUMENTS

| | | |
|---|---|---|
| CN | 111144470 A | 5/2020 |
| WO | 2019/245006 A1 | 12/2019 |

OTHER PUBLICATIONS

Eric L. Goodman, et al., "Packet2Vec: Utilizing Word2Vec for Feature Extraction in Packet Data", arxiv.org, Cornell University Library, Apr. 29, 2020, XP081655129, 16 pages.

Xiaoyan Zhuo, et al., "Network Intrusion Detection using Word Embeddings", 2017 IEEE International Conference on Big Data (BIGDATA), Dec. 11, 2017 (Retrieved on Jan. 12, 2018), XP033298828, 10 pages.

Mamoru Mimura, et al., "Reading Network Packets as a Natural Language for Intrusion Detection", National Defense Academy, Mar. 21, 2018, XP047466168, 12 pages.

(Continued)

*Primary Examiner* — Daniel C Washburn
*Assistant Examiner* — Paul J. Mueller
(74) *Attorney, Agent, or Firm* — XSENSUS LLP (57) ABSTRACT

A detection device includes: an encoding unit that converts one packet to be detected into one fixed-length vector by using natural language processing technology; and a detection unit that detects presence or absence of an abnormality in the packet to be detected based on the fixed-length vector converted by the encoding unit using a detection model.

5 Claims, 11 Drawing Sheets

(56) References Cited

OTHER PUBLICATIONS

"Download Wireshark", Available Online at: https://www.wireshark.org/download.html, Retrieved on Aug. 3, 2020, 4 pages.
"Zeek", Available Online at: URL:http://www.3gpp.org/ftp//Specs/archive/29_series/29.165/29165-f60.zip, Retrieved on Aug. 3, 2020, 11 pages.
Mikolov et al., "Efficient Estimation of Word Representations in Vector Space", Computer Science, Computation and Language, arXiv:1301.3781, Available Online at: https://arxiv.org/abs/1301.3781, Retrieved on Sep. 8, 2020, 2 pages.
Le et al., "Distributed Representations of Sentences and Documents", Computer Science, Computation and Language, arXiv:1405.4053, Available Online at: https://arxiv.org/abs/1405.4053, Retrieved on Sep. 8, 2020, 2 pages.
Peters et al., "Deep contextualized word representations", Computer Science, Computation and Language, arXiv:1802.05365, Available Online at: https://arxiv.org/abs/1802.05365, Retrieved on Sep. 8, 2020, 2 pages.
Furata et al., "Proposal of the System to Select Targets to Preserve Using Machine Learning". 2018 Symposium on Cryptography and Information Security Proposed Method, Jan. 23-26, 2018, 9 pages.
International Search Report and Written Opinion mailed on Feb. 2, 2021, received for PCT Application PCT/JP2020/035631, filed on Sep. 18, 2020, 8 pages including English Translation.
Shuyuan Zhao, et al., "Towards Unknown Traffic Identification via Embeddings and Deep Autoencoders", 2019 26th International Conference on Telecommunications (ICT), IEEE, Apr. 8, 2019, 5 pages, XP033596512.

\* cited by examiner

DETECTING APPARATUS, TRAINING APPARATUS, DETECTING METHOD, TRAINING METHOD, DETECTING PROGRAM, AND TRAINING PROGRAM

Cross-Reference to Related Application

The present application is based on PCT filing PCT/JP2020/035631, filed Sep. 18, 2020, the entire contents of which are incorporated herein by reference.

TECHNICAL FIELD

The present invention relates to a detection device, a learning device, a detection method, a learning method, a detection program, and a learning program.

BACKGROUND ART

Abnormality detection systems and intrusion detection systems (OT-IDS: Operational Technology-Intrusion Detection System) for communication used in industrial and building system network control systems have attracted attention.

In the communication of the control system, for example, even if the set value of a temperature changes by one digit, there is a risk of causing a serious accident. Therefore, it is necessary to detect an unauthorized rewriting of 1 byte of the communication content (payload) without this being overlooked. Therefore, in abnormality detection systems for industrial and building system network control systems, detailed analysis of contents of a payload is essential.

CITATION LIST

Non Patent Literature

Non Patent Literature 1: Wireshark, [retrieved on Aug. 3, 2020], Internet <URL:https://www.wireshark.org/download.html>

Non Patent Literature 2: zeek, [retrieved on Aug. 3, 2020], Internet <URL:http://www.3gpp.org/ftp//Specs/archive/29_series/29.165/29165-f60.zip>

SUMMARY OF INVENTION

Technical Problem

However, various communication protocols are used in industrial and building networks, and some original protocols of which specifications are not disclosed may be used. Therefore, there are many cases where analysis using prior knowledge such as a frame format and a parser of a communication packet of the technology of the related art is not successful.

The present invention has been made in view of the above, and an object thereof is to provide a detection device, a learning device, a detection method, a learning method, a detection program, and a learning program capable of detecting an abnormality occurring in the content of a packet without depending on a communication protocol.

Solution to Problem

In order to solve the above problem and achieve the object, a detection device according to the present invention includes: a first conversion unit that converts one packet to be detected into one fixed-length vector by using natural language processing technology; and a first detection unit that detects presence or absence of an abnormality in the packet to be detected based on the fixed-length vector converted by the first conversion unit using a detection model.

In addition, a learning device according to the present invention includes: a second conversion unit that converts one packet in a normal state into one fixed-length vector by using natural language processing technology; a second detection unit that detects presence or absence of an abnormality in the packet in the normal state based on the fixed-length vector converted by the second conversion unit using a detection model; and a learning control unit that causes the detection model to learn a pattern of the fixed-length vector corresponding to the packet in the normal state.

Advantageous Effects of Invention

According to the present invention, it is possible to detect an abnormality occurring in contents of a packet without depending on a communication protocol.

DESCRIPTION OF EMBODIMENTS

Hereinafter, an embodiment of the present invention will be described in detail with reference to the drawings. Note that the present invention is not limited by this embodiment. In the description of the drawings, the same parts will be given the same reference numerals.

Embodiment

Next, an embodiment of the present invention will be described. In the present embodiment, one packet is encoded into one fixed-length vector by regarding each protocol as different languages and applying a technology of natural language processing. Then, in the present embodiment, a normal pattern of the encoded vector is extracted, and a vector different from the normal pattern is detected to detect an abnormality. Accordingly, in the present invention, it is possible to detect an abnormality occurring in contents of a packet without depending on a communication protocol.

[Detection System]

Figure 1:
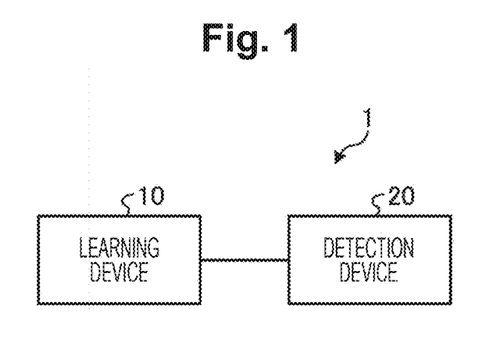
FIG. 1 is a diagram illustrating an example of a configuration of a detection system according to an embodiment.

FIG. 1 is a diagram illustrating an example of a configuration of a detection system according to an embodiment. As illustrated in FIG. 1, a detection system 1 according to the embodiment includes a learning device 10 and a detection device 20. The learning device 10 and the detection device 20 are connected via, for example, a network or the like. Furthermore, the learning device 10 and the detection device 20 are connected to an external device via, for example, a network or the like.

The learning device 10 causes the detection model to learn the pattern of the fixed-length vector corresponding to the packet in the normal state based on one fixed-length vector obtained by converting one packet in the normal state, which is the learning target data, using natural language processing technology.

In addition, the detection device 20 converts a packet to be detected into a fixed-length vector by using natural language processing technology, and detects presence or absence of an abnormality in the packet to be detected based on the converted fixed-length vector using a detection model learned in the learning device 10.

[Configuration of Learning Device]

Figure 2:
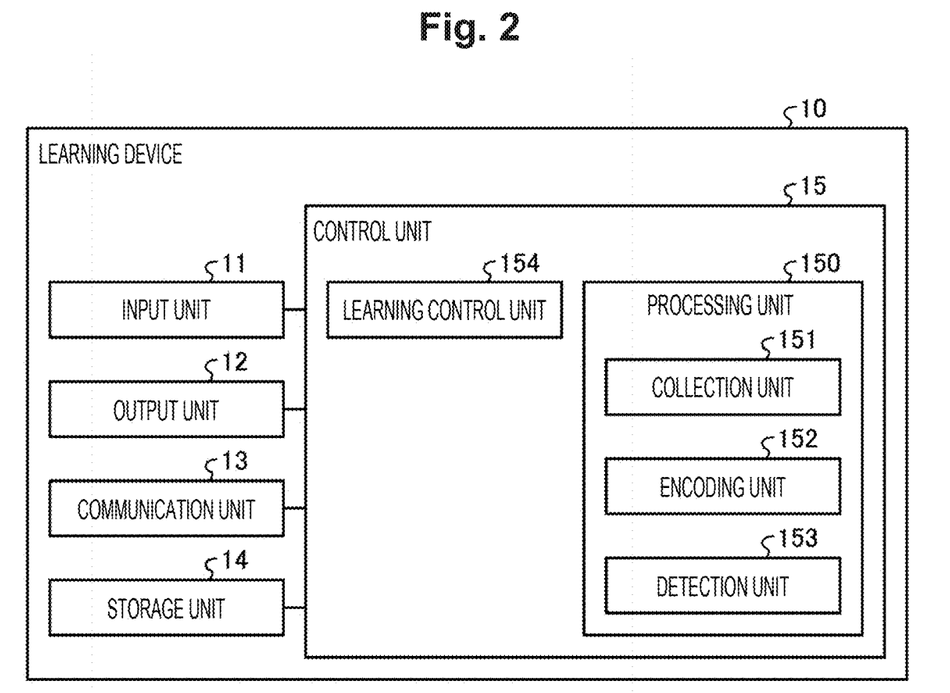
FIG. 2 is a diagram illustrating an example of a configuration of a learning device illustrated in FIG. 1.
Figure 3:
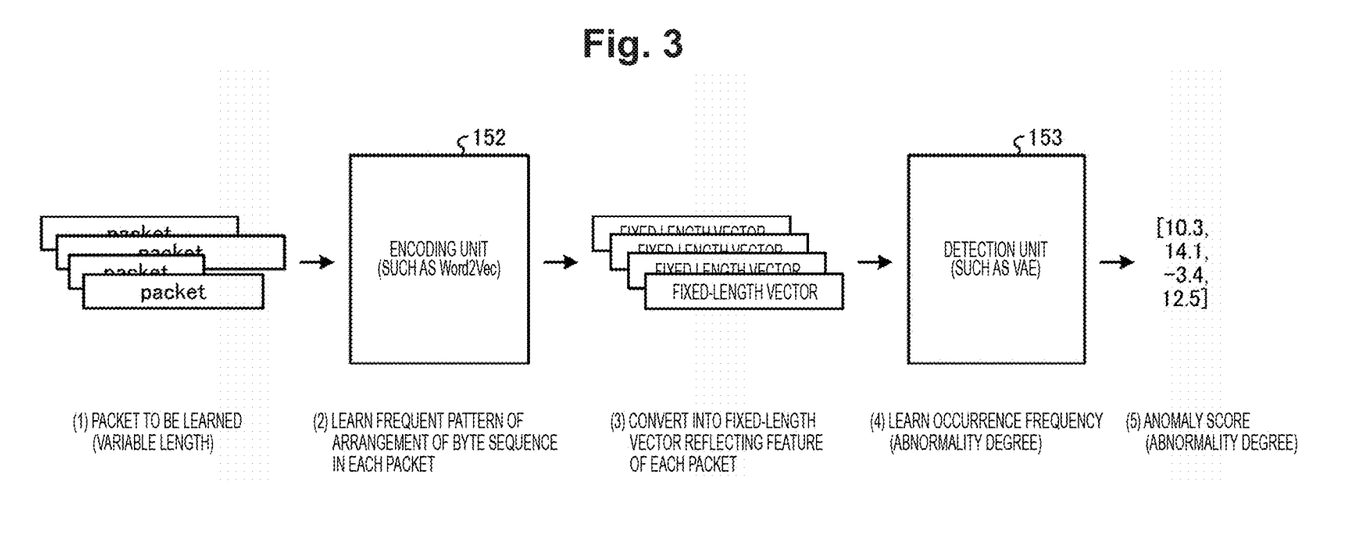
FIG. 3 is a diagram for explaining a flow of learning processing executed by the learning device illustrated in FIG. 2.

Next, the configuration of the learning device 10 will be described. FIG. 2 is a diagram illustrating an example of the configuration of the learning device 10 illustrated in FIG. 1. As illustrated in FIG. 2, the learning device 10 includes an input unit 11, an output unit 12, a communication unit 13, a storage unit 14, and a control unit 15. Furthermore, FIG. 3 is a diagram for explaining a flow of learning processing executed by the learning device 10 illustrated in FIG. 2.

The input unit 11 is an input interface that receives various operations from an operator of the learning device 10. For example, the input unit 11 includes a touch panel, a voice input device, and an input device such as a keyboard and a mouse.

The output unit 12 is realized by a display device such as a liquid crystal display, a printing device such as a printer, an information communication device, or the like.

The communication unit 13 includes a communication interface that transmits and receives various types of information to and from another device connected via a network or the like. For example, the communication unit 13 is realized by a network interface card (NIC) or the like, and performs communication between another device and the control unit 15 (described later) via an electric telecommunication line such as a local area network (LAN) or the Internet. For example, the communication unit 13 receives a packet in a normal state as learning target data via the network and outputs the packet to the control unit 15. Furthermore, the communication unit 13 outputs the learned detection model and the parameters of the encoder that have learned the conversion rule into the fixed-length vector to the detection device 20 via the network.

The storage unit 14 is a storage device such as a hard disk drive (HDD), a solid state drive (SSD), or an optical disc. Note that the storage unit 14 may be a semiconductor memory capable of rewriting data, such as a random access memory (RAM), a flash memory, or a non-volatile static random access memory (NVSRAM). The storage unit 14 stores an operating system (OS) and various programs executed by the learning device 10. Furthermore, the storage unit 14 stores various types of information used for executing the program.

The control unit 15 controls the entire learning device 10. Note that the control unit 15 includes, for example, an electronic circuit such as a central processing unit (CPU) or a micro processing unit (MPU), or an integrated circuit such as an application specific integrated circuit (ASIC) or a field programmable gate array (FPGA). Further, the control unit 15 includes an internal memory for storing programs and control data defining various processing procedures, and executes each processing using the internal memory. Furthermore, the control unit 15 functions as various processing units by various programs operating. The control unit 15 includes a processing unit 150 and a learning control unit 154.

The processing unit 150 encodes a packet in a normal state, which is learning target data, and performs processing of detecting the presence or absence of abnormality of the packet by using the detection model after encoding. The processing unit 150 includes a collection unit 151, an encoding unit 152 (second conversion unit), and a detection unit 153 (second detection unit).

The learning control unit 154 causes the detection model to learn the pattern of the fixed-length vector corresponding to the packet in the normal state. The learning control unit 154 causes the encoding unit 152 to learn a packet conversion rule by using a packet in a normal state.

The collection unit 151 collects packets to be learned. The collection unit 151 acquires a plurality of packets (variable lengths) in a normal state as packets to be learned ((1) in FIG. 3).

The encoding unit 152 converts one packet in a normal state into one fixed-length vector by using natural language processing technology. The learning control unit 154 causes the encoding unit 152 to learn a rule for converting one packet into one fixed-length vector by using a packet in a normal state. That is, under the control of the learning control unit 154, the encoding unit 152 learns a rule for converting one packet into one fixed-length vector by using a packet in a normal state. The learning control unit 154 causes the encoding unit 152 to learn a frequent pattern of the arrangement of the internal byte sequences in a packet in a normal state ((2) in FIG. 3). In other words, under the control of the learning control unit 154, the encoding unit 152 learns the frequent pattern of the arrangement of the internal byte sequences in the packet in the normal state.

The encoding unit 152 regards one packet as one sentence and learns a rule for conversion into one fixed-length vector by using a Pre-training Model of a natural language processing system such as Word2Vec (refer to Reference Literature 1), Doc2Vec (refer to Reference Literature 2), or ELMo (refer to Reference Literature 3). Note that the learning method differs depending on the algorithm adopted in the encoding unit 152.

Reference Literature 1: Tomas Mikolov, Kai Chen, Greg Corrado, and Jeffrey Dean, "Efficient Estimation of Word Representations in Vector Space", [retrieved on Sep. 8, 2020], Internet <URL:https://arxiv.org/abs/1301.3781>

Reference Literature 2: Quoc V. Le, and Tomas Mikolov, "Distributed Representations of Sentences and Documents", [retrieved on Sep. 8, 2020], Internet <URL: https://arxiv.org/abs/1405.4053>

Reference Literature 3: Matthew E. Peters, Mark Neumann, Mohit Iyyer, Matt Gardner, Christopher Clark, Kenton Lee, and Luke Zettlemoyer, "Deep contextualized word representations", [retrieved on Sep. 8, 2020], Internet <URL:https://arxiv.org/abs/1802.05365>

For example, in the Word2Vec, distributed representation of a word is learned through learning of an auxiliary task such as Skip-Gram or CBOW. Skip-Gram is a task of predicting a surrounding word from a certain word. In addition, CBOW is a task of predicting a word at the center from a surrounding word. Since the sentence is a collection of words, the distributed representation of the sentence can be indirectly acquired by regarding the average of all the words in the document as the vector of the document.

Figure 4:
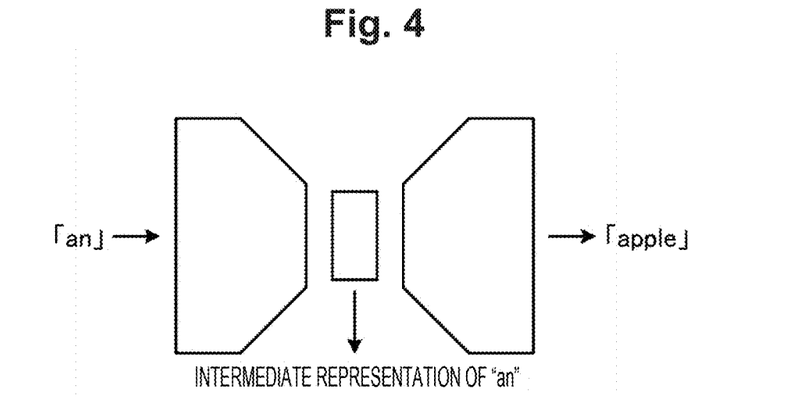
FIG. 4 is a diagram illustrating an example of document learning.

FIG. 4 is a diagram illustrating an example of document learning. An object of Word2Vec (Skip-Gram) is to obtain a good intermediate representation by solving the task of "predict surrounding word from target word". For example, in a case of learning a document "I like an apple.", in Procedure 1, "I" is focused on, and "like" is predicted. In Procedure 2, "like" is focused on, and "I" and "an" are predicted. In Procedure 3, "an" is focused on, and "like" and "apple" are predicted. Then, in Procedure 4, "apple" is focused on, "an" is predicted.

In a model such as Doc2Vec or ELMo, a distributed representation of a document can be directly obtained through learning of auxiliary tasks according to each model. At this time, in preprocessing such as word separation necessary for learning of the Pre-training Model, the packet is represented in a hexadecimal format, divided for every 1 byte, and position information (such as what numbered byte of the packet) is added according to the Pre-training Model to be used.

Then, the encoding unit 152 converts each packet into a fixed-length vector reflecting the feature of each packet by using the Pre-training Model of the natural language processing system ((3) in FIG. 3).

The detection unit 153 detects the presence or absence of abnormality of the packet in the normal state based on the fixed-length vector converted by the encoding unit 152 using the detection model. The learning control unit 154 causes the detection model to learn the pattern of the fixed-length vector corresponding to the packet in the normal state.

The detection unit 153 uses, as a detection model, an abnormality detection model based on unsupervised learning such as variational auto encoder (VAE), auto encoder (AE), or local outlier factor (LoF). For example, in VAE, after learning a probability density of a normal communication packet, communication with a low probability density is detected as an abnormality. Therefore, it is sufficient to know only a normal communication packet, and abnormality detection can be performed without learning all malicious data.

The detection unit 153 acquires the abnormality degree (the occurrence frequency of an abnormal packet) with respect to the fixed-length vector converted by encoding unit 152 using the detection model, whereby learning the abnormality degree is performed based on the fixed-length vector corresponding to the packet in the normal state ((4) in FIG. 3). The detection unit 153 acquires, for example, an anomaly score as an abnormality degree using the detection model ((5) in FIG. 3). The learning control unit 154 adjusts the parameters of the detection model so that the abnormality degree acquired by the detection unit 153 is minimized.

The learning device 10 outputs, to the detection device 20, a rule for converting one packet in the encoding unit 152 into one fixed-length vector, which has been learned according to the control of the learning control unit 154, a detection model such as VAE adjusted by the learning control unit 154, and parameters thereof.

[Configuration of Detection Device]

Figure 5:
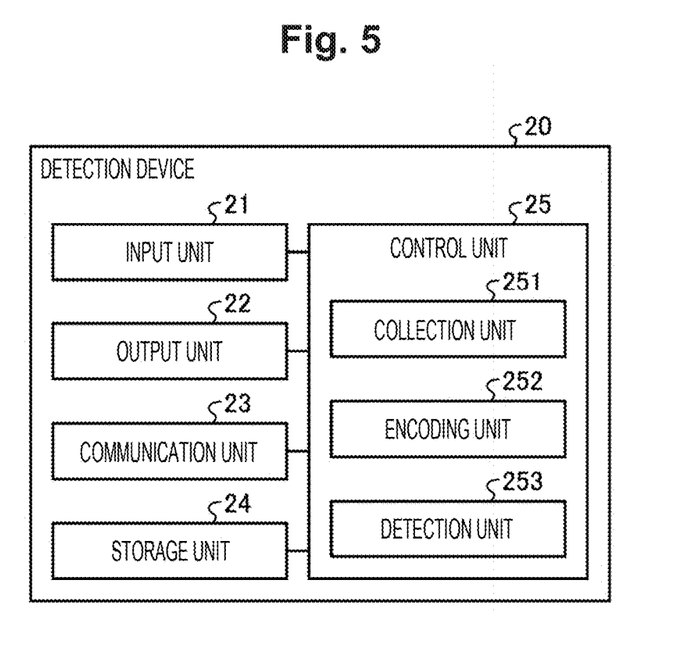
FIG. 5 is a diagram illustrating an example of a configuration of a detection device illustrated in FIG. 1.
Figure 6:
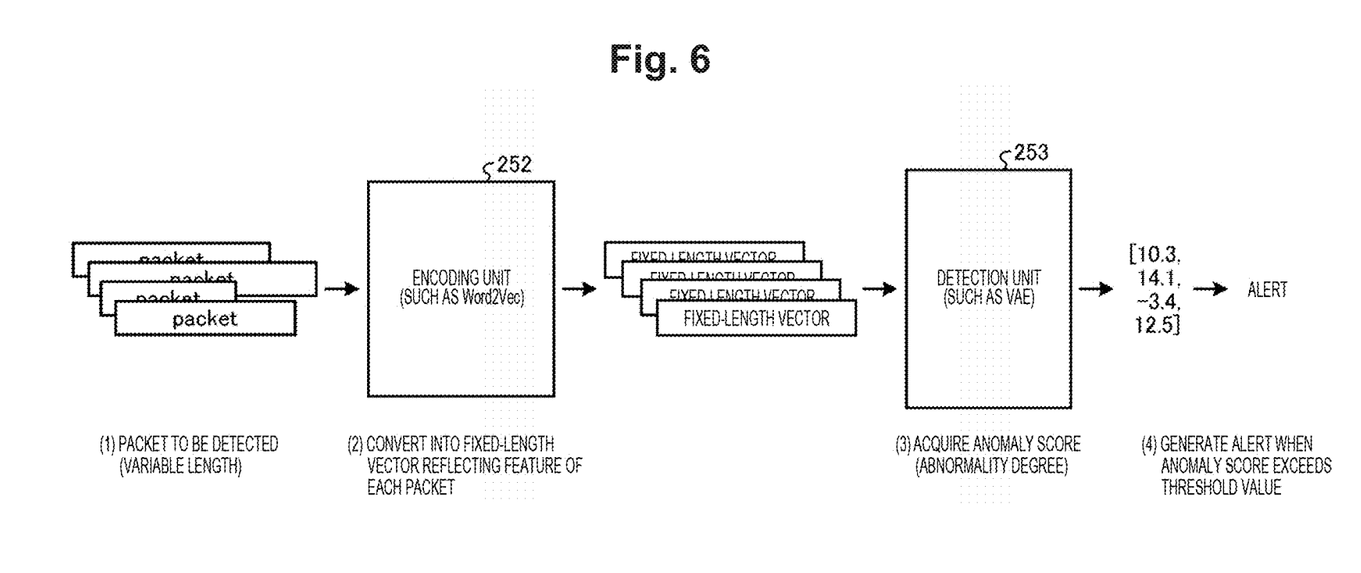
FIG. 6 is a diagram for explaining a flow of detection processing executed by the detection device illustrated in FIG. 5.

Next, the configuration of the detection device 20 will be described. FIG. 5 is a diagram illustrating an example of the configuration of the detection device 20 illustrated in FIG. 1. As illustrated in FIG. 5, the detection device 20 includes an input unit 21, an output unit 22, a communication unit 23, a storage unit 24, and a control unit 25. FIG. 6 is a diagram for explaining a flow of detection processing executed by the detection device 20 illustrated in FIG. 5.

The input unit 21 is an input interface that receives various operations from an operator of the detection device 20, and includes a touch panel, a voice input device, and an input device such as a keyboard and a mouse.

The output unit 22 is realized by a display device such as a liquid crystal display, a printing device such as a printer, information communication device, or the like.

The communication unit 23 is a communication interface that transmits and receives various types of information to and from another device connected via a network or the like, and performs communication between another device and the control unit 25 (described later) via an electric telecommunication line such as an NIC or the Internet. For example, the communication unit 23 receives a packet to be detected via the network and outputs the packet to the control unit 25. Furthermore, the communication unit 23 outputs the presence or absence of abnormality in the packet to be detected to the detection device 20 via the network.

The storage unit 24 is a storage device such as an HDD, an SSD, or an optical disc. Note that the storage unit 24 may be a semiconductor memory capable of rewriting data, such as a RAM, a flash memory, or an NVSRAM. The storage unit 24 stores an OS and various programs executed by the detection device 20. Furthermore, the storage unit 24 stores various types of information used for executing the program.

The control unit 25 controls the entire detection device 20. The control unit 25 is, for example, an electronic circuit such as a CPU or an MPU, or an integrated circuit such as an ASIC or an FPGA. Further, the control unit 25 includes an internal memory for storing programs and control data defining various processing procedures, and executes each processing using the internal memory. Furthermore, the control unit 25 functions as various processing units by various programs operating. The control unit 25 includes a collection unit 251, an encoding unit 252 (first conversion unit), and a detection unit 253 (first detection unit).

The collection unit 251 collects packets to be detected. The collection unit 251 acquires a plurality of variable-length packets as packets to be detected ((1) in FIG. 6).

The encoding unit 252 converts one packet to be detected into one fixed-length vector by using natural language processing technology. The encoding unit 152 regards one packet as one sentence and converts the packet into one fixed-length vector by using a Pre-training Model of a natural language processing system such as Word2Vec, Doc2Vec, or ELMo. The encoding unit 252 converts one packet to be detected into one fixed-length vector by using the rule for converting one packet into one fixed-length vector output from the learning device 10. In this manner, the encoding unit 152 converts each variable-length packet into a fixed-length vector reflecting the feature of each packet by using the Pre-training Model of the natural language processing system ((2) in FIG. 6).

The detection unit 253 detects the presence or absence of abnormality of the packet to be detected based on the fixed-length vector converted by the encoding unit 252 using the detection model. The detection unit 253 detects the abnormality of the packet to be detected when a pattern of the fixed-length vector converted by the encoding unit 252 is different from a pattern of the fixed-length vector corresponding to a packet in a normal state.

The detection unit 253 uses an abnormality detection model based on unsupervised learning such as VAE, AE, or LoF, in which parameters have been adjusted by learning processing in the learning device 10. The detection unit 253 acquires an abnormality degree (for example, an anomaly score) with respect to the fixed-length vector converted by the encoding unit 252 by using the detection model ((3) in FIG. 6). Then, when the anomaly score exceeds a predetermined threshold value, the detection unit 253 detects an abnormality of the packet to be detected and generates an alert ((4) in FIG. 6). The threshold value is set according to, for example, required detection accuracy, resources of the detection device 20, and the like.

[Learning Processing]

Figure 7:
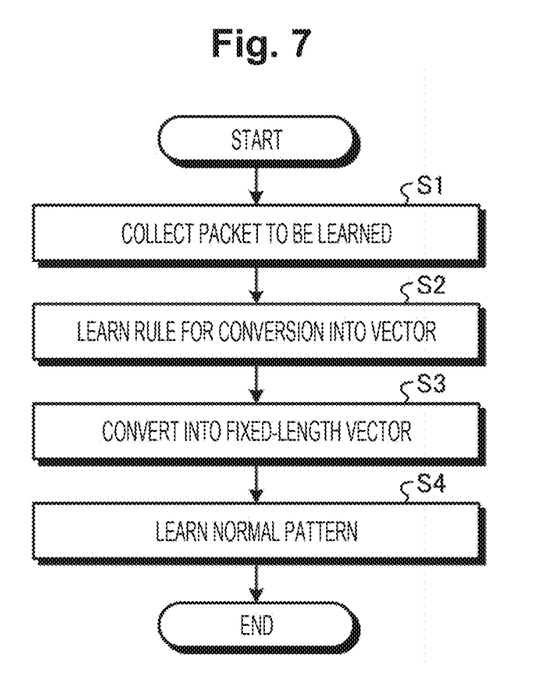
FIG. 7 is a flowchart illustrating a processing procedure of a learning method according to the embodiment.

Next, learning processing according to the embodiment will be described. FIG. 7 is a flowchart illustrating a processing procedure of a learning method according to the embodiment.

As illustrated in FIG. 7, in the learning device 10, the collection unit 151 collects packets (variable length) to be learned (step S1). Subsequently, under the control of the learning control unit 154, the encoding unit 152 learns a rule for converting one packet into one fixed-length vector by using a packet in a normal state (step S2).

The encoding unit 152 converts each packet to be learned into a fixed-length vector by using natural language processing technology (step S3). Then, under the control of the learning control unit 154, the detection unit 153 causes the detection model to learn the pattern of the fixed-length vector corresponding to the packet in the normal state (step S4). Then, the learning device 10 outputs, to the detection device 20, a rule for converting one packet into one fixed-length vector, a detection model such as VAE adjusted by the learning control unit 154, and parameters thereof, and ends the learning processing.

[Detection Processing]

Figure 8:
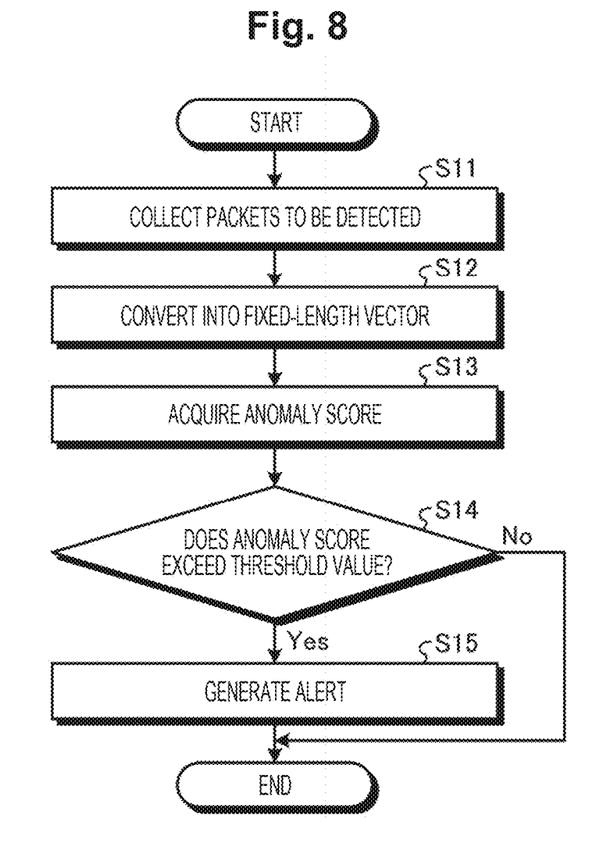
FIG. 8 is a flowchart illustrating a processing procedure of a detection method according to the embodiment.

Next, detection processing according to the embodiment will be described. FIG. 8 is a flowchart illustrating a processing procedure of a detection method according to the embodiment.

As illustrated in FIG. 8, the detection device 20 collects packets (variable length) to be detected (step S11). The encoding unit 252 converts one packet to be detected into one fixed-length vector by using natural language processing technology (step S12).

Then, the detection unit 253 acquires an anomaly score with respect to the fixed-length vector converted by the encoding unit 252 by using the detection model (step S13). The detection unit 253 determines whether the acquired anomaly score exceeds a predetermined threshold value (step S14).

When the anomaly score exceeds a predetermined threshold value (step S14: Yes), the detection unit 253 detects an abnormality of the packet to be detected and generates an alert (step S15). When the anomaly score is equal to or less than the predetermined threshold value (step S14: No), the detection device 20 ends the detection processing with respect to the packet to be detected.

[Evaluation Experiment]

Figure 9:
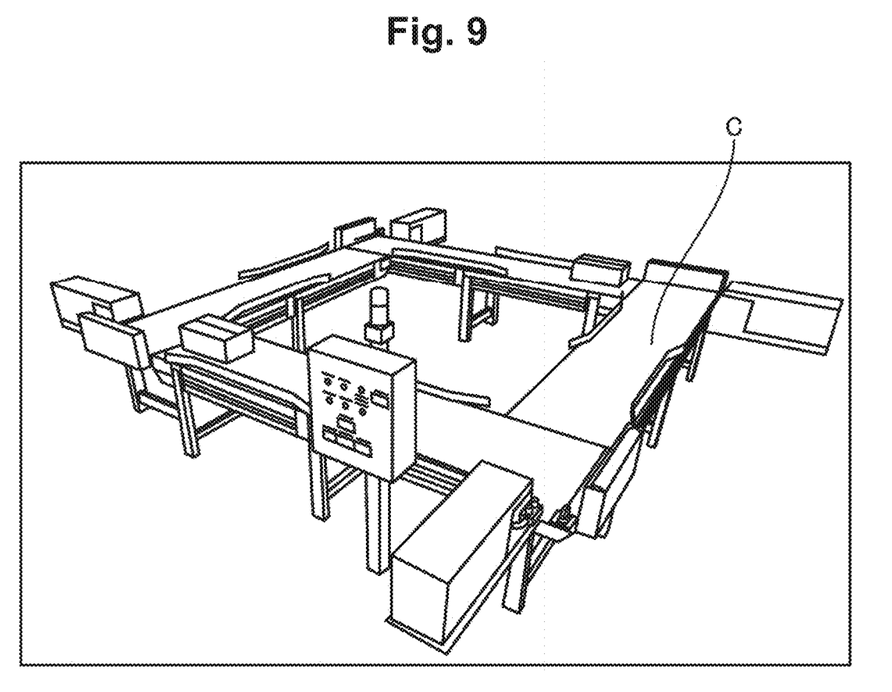
FIG. 9 is a view illustrating an outline of a control system in which an evaluation experiment has been performed.

An evaluation experiment for evaluating detection performance was performed by applying the detection processing of the present embodiment. In the evaluation experiment, a simple control system for controlling a belt conveyor or the like installed in a square using a programmable logic controller (PLC) was constructed using a virtual environment. Factory.io and Codesys were used as the virtual environment. FIG. 9 is a view illustrating an outline of the control system in which the evaluation experiment has been performed.

The PLC controls the speed of a belt conveyor C and ON/OFF of the pushers installed at the four corners using the Modbus/TCP protocol based on information from the object sensors installed at the four corners of the belt conveyor C. The speed of the belt conveyor C can also be manually changed from the control panel of the belt conveyor in the virtual environment.

The speed of the belt conveyor is monitored by the PLC, and is circulated at a constant speed (normal system). When the speed of the belt conveyor exceeds a certain speed (abnormal system), an emergency stop command is issued from the PLC to the entire system. In such a system, a normal system packet and an abnormal system packet in a case where the speed is manually set to an abnormal value are collected, and an experiment of checking whether or not a packet generated in a case of the abnormal system can be detected was performed.

Figure 10:
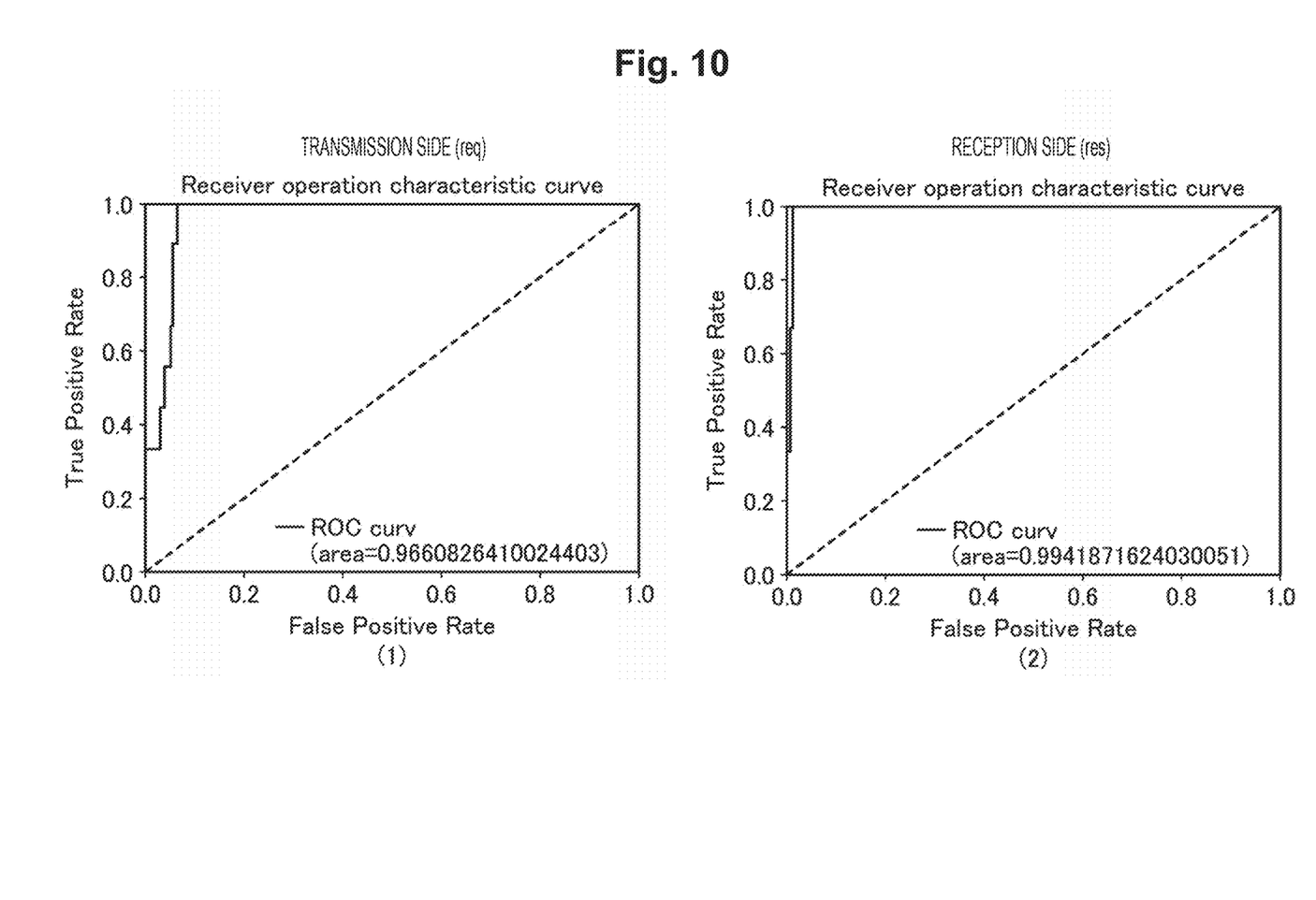
FIG. 10 is a diagram illustrating a result of an evaluation experiment.

FIG. 10 is a diagram illustrating the result of the evaluation experiment. As a result of the evaluation experiment, two receiver operating characteristic (ROC) curves are shown. (1) of FIG. 10 is a result for the packet transmitted from the PLC, and (2) of FIG. 10 is a result for the packet received by the PLC. In both transmission and reception, the area under the curve (AUC), which is the area under the ROC curve, exceeds 0.95. Therefore, the detection method according to the present embodiment can detect the occurrence of the abnormality well, and shows a good result.

Effects of Embodiment

As described above, in the embodiment, the technology of the natural language processing is applied to the vector of the packet, and the abnormality detection by the unsupervised learning applicable to any packet is proposed.

In the present embodiment, one packet (variable length) is encoded into one fixed-length vector by regarding each protocol as different languages and applying a technology of natural language processing. The fixed-length vector can be expected to be a vector reflecting the feature of the packet. After this, a normal pattern of the encoded vector is extracted, and a vector different from the normal pattern is detected to detect an abnormality. A packet of a control system protocol usually includes a control command and a plurality of parameters. In the present embodiment, it is possible to extract a pattern of a command, a parameter, or the like at a normal time from a binary in a packet and learn an abstracted normal state by using natural language processing technology.

As a result, according to the present embodiment, it is possible to detect an abnormality in a packet of any protocol with high accuracy in consideration of the content of the packet. That is, according to the present embodiment, by using natural language processing technology such as Word2Vec or ELMo in combination with an unsupervised abnormality detection technology such as VAE or LOF, an abnormality detection system that detects an abnormality occurring in the content of a packet without depending on a communication protocol is realized.

EXAMPLE

The detection method according to the present embodiment can be applied to an abnormality detection system of an IoT device.

A network sensor is arranged in the IoT network, and packet capture is performed. The learning device 10 learns the encoding unit 152 and the detection unit 153 by using the captured packet.

After the learning is completed, the packet acquired by the network sensor is input to the detection device 20. In the detection device 20, the encoding unit 252 encodes a packet into a fixed-length vector, and then the detection unit 253 calculates an anomaly score for each packet. The detection unit 253 determines whether or not the packet to be evaluated is similar to the packet acquired at the time of learning (that is, whether or not the packet is a normal packet) by using the anomaly score.

[System Configuration and Others]

Each component of each device that has been illustrated is functionally conceptual, and is not necessarily physically configured as illustrated. That is, a specific form of distribution and integration of each device is not limited to the illustrated form. All or some of the components may be functionally or physically distributed and integrated in an arbitrary unit according to various loads, usage conditions, and the like. Furthermore, all or any part of each processing function performed in each apparatus can be realized by a CPU and a program analyzed and executed by the CPU, or can be realized as hardware by wired logic.

Further, among pieces of processing described in the present embodiment, all or some of pieces of processing described as being automatically performed may be manually performed, or all or some of pieces of processing described as being manually performed may be automatically performed by a known method. In addition, the processing procedure, the control procedure, the specific name, and the information including various data and parameters that are illustrated in the document and the drawings can be freely changed unless otherwise specified.

[Program]

Figure 11:
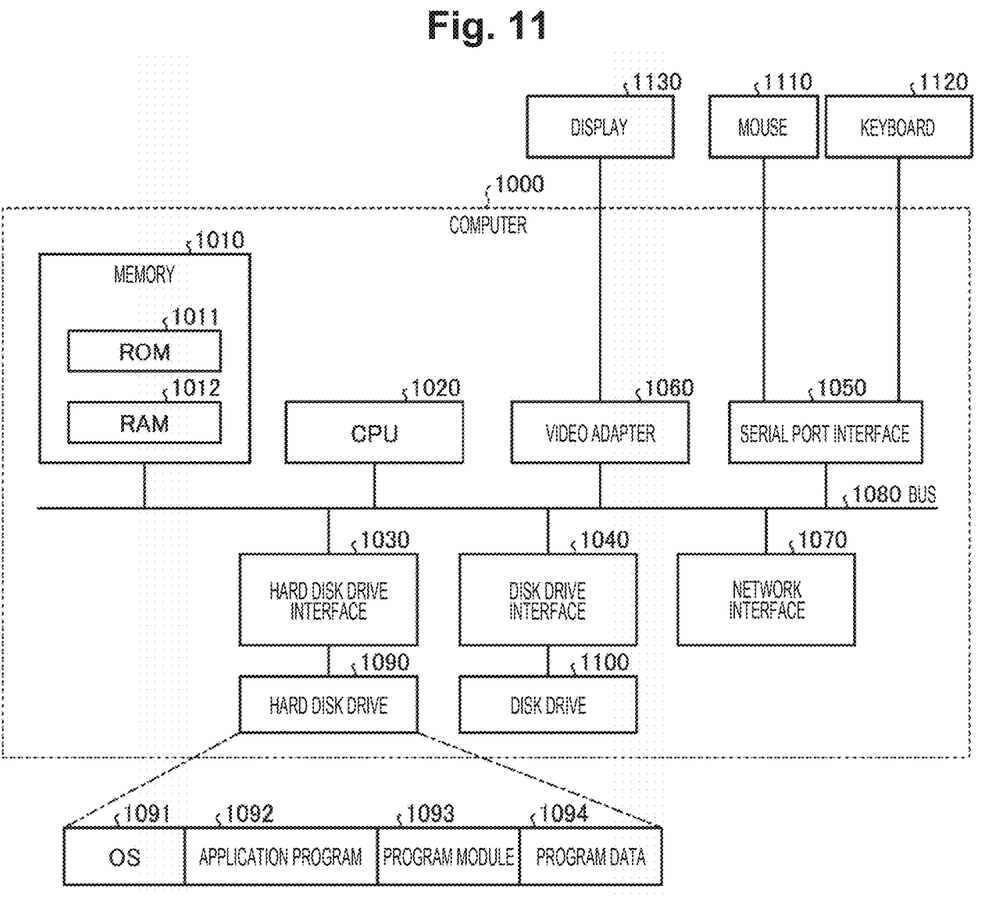
FIG. 11 is a diagram illustrating an example of a computer in which the learning device and the detection device are realized by executing a program.

FIG. 11 is a diagram illustrating an example of a computer in which the learning device 10 and the detection device 20 are implemented by executing a program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines each processing of the learning device 10 and the detection device 20 is implemented as the program module 1093 in which a code executable by the computer is described. The program module 1093 is stored in, for example, the hard disk drive 1090. For example, the program module 1093 for executing processing similar to the functional configuration of the learning device 10 and the detection device 20 is stored in the hard disk drive 1090. Note that the hard disk drive 1090 may be replaced with a solid state drive (SSD).

Furthermore, setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 to the RAM 1012, and executes the program module 1093 and the program data 1094 as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (LAN, wide area network (WAN), or the like). Then, the program module 1093 and the program data 1094 may be read by the CPU 1020 from another computer via the network interface 1070.

Although the embodiments to which the invention made by the present inventor is applied have been described above, the present invention is not limited by the description and drawings constituting a part of the disclosure of the present invention according to the present embodiments. In other words, other embodiments, examples, operation techniques, and the like made by those skilled in the art and the like on the basis of the present embodiments are all included in the scope of the present invention.

REFERENCE SIGNS LIST

1 Detection system
10 Learning device
11, 21 Input unit
12, 22 Output unit
13, 23 Communication unit
14, 24 Storage unit
15, 25 Control unit
20 Detection device
150 Processing unit
151, 251 Collection unit
152, 252 Encoding unit
153, 253 Detection unit
154 Learning control unit

The invention claimed is:

1. A detection device, comprising:
   a memory; and
   a processor coupled to the memory and programmed to execute perform a process comprising:
      applying a pretrained language model to a packet to be detected to produce a fixed-length vector that represents features of an internal byte sequence in the packet to be detected; and
      detecting presence or absence of an abnormality in the packet to be detected by applying a pretrained detection model to the fixed-length vector, wherein:
   the pretrained detection model is one of a variational auto encoder (VAE), an auto encoder (AE), and a local outlier factor (LoF);
   training data for the pretrained detection model is a set of normal fixed-length vectors; and
   the normal fixed-length vectors are produced by applying the pretrained language model to normal packets.

2. The detection device of claim 1, wherein the detecting presence or absence of an abnormality in the packet to be detected includes detecting the abnormality of the packet to be detected when a pattern of the fixed-length vector is different from patterns of the normal fixed-length vectors.

3. The detection device of claim 1, wherein the detecting presence or absence of an abnormality in the packet to be detected includes (i) obtaining an abnormality degree with respect to the fixed-length vector and (ii) detecting an abnormality of the packet to be detected when the abnormality degree exceeds a predetermined threshold value.

4. A detection method executed by a detection device, the detection method comprising:
   applying a pretrained language model to a packet to be detected to produce a fixed-length vector that represents features of an internal byte sequence in the packet to be detected; and
   detecting presence or absence of an abnormality in the packet to be detected based by applying a pretrained detection model to the fixed-length vector, wherein:
   the pretrained detection model is one of a variational auto encoder (VAE), an auto encoder (AE), and a local outlier factor (LoF);
   training data for the pretrained detection model is a set of normal fixed-length vectors; and
   the normal fixed-length vectors are produced by applying the pretrained language model to normal packets.

5. A computer-readable recording medium storing computer executable instructions which, when executed by a processor, cause the processor to perform a process comprising:
   applying a pretrained language model to a packet to be detected to produce a fixed-length vector that represents features of an internal byte sequence in the packet to be detected; and
   detecting presence or absence of an abnormality in the packet to be detected based by applying a pretrained detection model to the fixed-length vector, wherein:
   the pretrained detection model is one of a variational auto encoder (VAE), an auto encoder (AE), and a local outlier factor (LoF);
   training data for the pretrained detection model is a set of normal fixed-length vectors; and
   the normal fixed-length vectors are produced by applying the pretrained language model to normal packets.

* * * * *